(12) United States Patent
Lunsford

(10) Patent No.: US 9,612,708 B2
(45) Date of Patent: Apr. 4, 2017

(54) SYSTEMS AND METHODS FOR POLYMORPHIC CONTENT GENERATION IN A MULTI-APPLICATION, MULTI-TENANT ENVIRONMENT

(75) Inventor: John M. Lunsford, Mount Pleasant, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 1184 days.

(21) Appl. No.: 13/020,376

(22) Filed: Feb. 3, 2011

(65) Prior Publication Data

US 2011/0191702 A1 Aug. 4, 2011

Related U.S. Application Data

(60) Provisional application No. 61/300,979, filed on Feb. 3, 2010.

(51) Int. Cl.
*G06F 3/048* (2013.01)
*G06F 17/30* (2006.01)

(52) U.S. Cl.
CPC .......... *G06F 3/048* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 6,944,829 B2* | 9/2005 | Dando | 715/798 |
| 7,543,267 B2* | 6/2009 | Lindhorst et al. | 717/105 |
| 8,332,435 B2* | 12/2012 | Ballard et al. | 707/795 |
| 2003/0074634 A1* | 4/2003 | Emmelmann | 715/513 |
| 2004/0148307 A1* | 7/2004 | Rempell | 707/102 |
| 2005/0076330 A1* | 4/2005 | Almgren et al. | 717/113 |
| 2009/0024915 A1* | 1/2009 | Cudich et al. | 715/234 |
| 2010/0023874 A1* | 1/2010 | Frohwein | 715/747 |

OTHER PUBLICATIONS

"How To: Adding Edit Buttons to Your WordPress Theme", archived by the Internet Wayback Machine Oct. 23, 2008, downloaded Mar. 22, 2013 from http://web.archive.org/web/20081023064849/http://wphacks.com/how-to-adding-edit-buttons-to-your-wordpress-theme.*
"Eden Platform", archived by Internet Wayback Machine, downloaded Mar. 20, 2013 from http://web.archive.org/web/20090131023936/http://preation.com/ http://web.archive.org/web/20081220225637/http://www.preation.com/content/features+in+eden+platform/53 http://web.archive.org/web/20090123125856/http://preation.com/content/standard+features+with+eden+plat.*
"Site-Helper.com—File Manager", archived by the Internet Way Back Machine Jan. 26, 2009, downloaded, Nov. 7, 2014.*

* cited by examiner

*Primary Examiner* — Jeffrey A Gaffin
*Assistant Examiner* — Paul Thatcher
(74) *Attorney, Agent, or Firm* — Todd Partners, P.C.; Jack D. Todd

(57) ABSTRACT

A computer system, and underlying methodologies, provides a content management system including a page editor. The page editor provides authoring tools to allow not only a developer/designer, but also an end user, to design, create, edit, store, organize and/or publish content. Different levels of permissions may be assigned to different end users. Preferably, the page editor includes a graphical user interface (GUI), which is presented to the end user by the computer system via a client device. The GUI presents development tools to the user to allow the user to design, create, edit, store, organize and/or publish, dynamically generated content that is presented as part of existing applications or pages. Further, the content management system allows the user to expose the page editor, including the GUI and development tools, as part of the user(s) content and to adjust the content-generation experience presented to other users of the application or page.

20 Claims, 17 Drawing Sheets

SYSTEMS AND METHODS FOR POLYMORPHIC CONTENT GENERATION IN A MULTI-APPLICATION, MULTI-TENANT ENVIRONMENT

CROSS REFERENCES TO RELATED APPLICATIONS

This application claims the benefit of U.S. Provisional Patent Application Ser. No. 61/300,979, filed Feb. 3, 2010, the contents of which are incorporated herein by reference in their entirety, as if set forth herein in full.

FIELD OF THE INVENTIONS

The present systems and methods relate generally to enabling display of dynamically-generated content within a user interface of a software application. More particularly, the present systems and methods relate to enabling dynamic content generation for applications and for exposing the same content-generation services to application users in a manner that is sensitive to the user's application and tenant context.

BACKGROUND

Content management or Web content management (WCM) systems and applications provide authoring tools designed to allow software developers to create, edit, store, organize and/or publish web or web-based content using a development "page" or "application" editor. Some content management tools attempt to group these processes in large, monolithic architectures. Some WCM systems use a database or other content repository to store content, metadata, and/or other information that may be needed by the WCM system. In many instances, these approaches require an organization to adopt proprietary languages and environments that are managed and used by skilled personnel, software designers and developers.

In general, WCM systems are used to manage and control large, dynamic collections of web-based material (e.g., Hypertext Markup Language (HTML) documents, PHP documents, images, etc.). A WCM system generally facilitates document control, editing, and timeline management. For instance, a typical WCM system can provide one or more of the following features: automated templates, easily editable content, workflow management, document management, and content virtualization, among others. A WCM system provide software developers and designers with tools that allow for the creation of attractive and well-designed application user-interfaces, web pages and/or websites with uniform or related layouts.

Many large organizations, such as corporate entities, provide a multiplicity of web sites to the public and internally throughout the organization. These organizations may involve different business or organization units that span diverse areas of expertise. For these and other practical reasons, smaller functional or operational groups within an organization often use different web sites or user interfaces to communicate unique information. Large organizations often require large numbers of trained and skilled technical personnel to have responsibility for adding, editing, and removing content on web sites or software application user interfaces. Thus, the ability to create web sites and software application user interfaces and, further, to update and maintain them without significant training requirements, and to allow for centralized sharing and administration of multiple web sites or software user interfaces within an enterprise would be useful.

There is a need in the industry to enable not only developers and designors to be able to create, edit, and maintain web pages and software application graphical user interfaces (GUIs), but also to provide end users with the ability to do the same. Preferably, the rights to create, edit, and maintain such web pages and software application user interfaces is granted to users, but at levels that are controlled and restricted based on authorization, permissions, and/or security levels unique to each user. Further, some users need to be able to grant further rights (to the same or lesser extent as their own rights) to other end users.

SUMMARY OF THE INVENTIONS

The systems and methods disclosed herein relate generally to enabling display of dynamically generated content. More particularly, the systems and methods disclosed herein relate to dynamic content generation for applications or pages and for exposing the same content generation services to users in a manner that is sensitive to the user's application or page and tenant context.

In an illustrative embodiment, the systems and methods disclosed herein enable users to dynamically generate content that is presented as part of multi-tenant applications. The systems and methods are capable of being exposed by a user and for adjusting the content-generation experience presented to consumers of the user's content. This allows software application content generation to take on many different experiences and to be exposed to many different types of users without the need to create additional content generation tools. For example, instead of simply building a "page editor" for an application or an isolated development environment, as is typically done in the industry when creating a software application, web site, or web-accessible software application, the development tools disclosed by the methods and systems herein are built as a reusable control that allows pages (i.e., "presentations") to expose tools to users of the application that enable such users to create application assets, content, and arrangement of the same, and optionally to expose the tools to even more users. Thus, this creates a potential recursive effect in which applications can be created collaboratively by different users at different levels. Such systems and methods differ markedly from traditional application development tools, in which those who interact with the application fall into two distinct groups: (i) developers/designers—who make the applications, and (ii) end-users—who use such applications. The systems and methods disclosed herein allows the line between developer/designer and end-user to blur and even disappear altogether.

In an illustrative embodiment, the systems and methods disclosed herein use a control-tree model for content generation. Preferably, a "control" is a software module that provides a well-defined piece of functionality and has a presentation component. Controls have properties that are specified by content creators and are often securable. Certain controls may be nested with each other. In an illustrative embodiment, certain controls, for example "parent controls," may be adapted to contain other controls, for example "child controls." These "child controls" often look to their "parent control" to define their presentation context. In the control-tree model, one begins with a root or page control (often termed the "page") and creates application content by creating a tree structure by nesting controls.

In an illustrative embodiment, the systems and methods disclosed herein enable the control-tree content generation process by providing a graphical user interface (GUI) for creating control-trees, adding controls to control-trees, re-ordering the controls within a control-tree, removing controls from control-trees, editing the properties defined by controls, and deleting control-trees.

In an illustrative embodiment, the systems and methods disclosed herein implement the same graphical user interface described above as a control that itself can be added to control-trees. This allows content generation services to be exposed to users and allows the users to expose content generation services to other users, and so on. Preferably, each iteration of the content generation services are application, tenant, and user aware and automatically scopes content creation editing and viewing to the appropriate context.

In a first primary embodiment, a method for dynamic content generation compprises receiving, by at least one computer, a request from a first user to modify a control-tree associated with an application, loading, by the at least one computer, the application in a graphical user interface (GUI) in response to receiving said request, providing, by the at least one computer, a page editor to the first user, the page editor configured to present a design-time experience for the application, providing, by the at least one computer, a list of controls to the first user via the GUI, including, by the at least one computer, the page editor as a control within the list of controls, allowing, by the at least one computer, the first user to select a control from the list of controls to add to the control-tree associated with the application, adding, by the at least one computer, the page editor as a control to the control-tree associated with the application in response to the first user selecting them page editor from the list of controls; and exposing, by the at least one computer, the page editor as the control to a second user. In a feature of this embodiment, the method further comprising displaying, by the at least one computer, the page editor added to the control-tree associated with the application as the control to said first user via said GUI.

In another feature, the system further comprises determining, by the at least one computer, whether the first user is authorized to modify the control-tree associated with the application.

In yet another feature, the method further comprises allowing, by the at least one computer, the first user to re-order said control-tree thereafter said application by dragging and dropping controls within the control-tree.

In another feature, the method further comprising allowing, by the at least one computer, the second user to modify said the control-tree associated with the application by accessing the page editor as the control.

In a further embodiment, the method further comprises allowing, by the at least one computer, the first user to restrict access to the page editor as the control. Preferably, the method further determines, by the at least one computer, whether the second user is authorized to access the page editor as the control.

In another feature, the method further comprises allowing, by the at least one computer, the first user to determine, define, allow, or restrict a set of controls exposed to the second user via the page editor as the control.

In yet a further feature of this first primary embodiment, the loading of the application in the GUI further includes instantiating, by the at least one computer, a designer associated with a control in the control-tree associated with the application. Preferably, loading the application in the GUI further includes replacing, by the at least one computer, the control with the designer in the control-tree associated with the application.

In a second primary embodiment, a content management system comprises at least one database, a plurality of content contained in the at least one database, and at least one computer server in communication with the at least one database, the at least one computer server configured to: (i) receive a request from a first user to modify a control-tree associated with an application, via a client device in communication with the at least one computer server; (ii) load the application into a graphical user interface (GUI) in response to receiving the request; (iii) provide a page editor to the first user through the GUI via the client device, the page editor configured to present a design-time experience for the application; (iv) allow the first user to select a control to add to the control-tree associated with the application; (v) add an instance of the page editor as a control to the control-tree associated with the application in response to the first user selecting the page editor as the control; and (vi) expose the page editor as the control to a second user.

In a feature of this second primary embodiment, the at least one computer server is further configured to display the page editor added as the control to the control-tree associated with the application to the first user via the GUI.

In another feature of the content management system, the at least one computer server is further configured to determine if the first user is authorized to modify the control-tree associated with the application.

In yet a further feature of the content management system, the at least one computer server is further configured to allow the second user to modify the control-tree associated with the application by accessing the page editor as the control.

In another feature of the content management system, the at least one computer server is farther configured to allow the first user to restrict access to the page editor as the control. Preferably, the at least one computer server is further configured to determine if the second user is authorized to access the page editor as the control.

In a feature of the content management system, the at least one computer server is further configured to allow the first user to re-order the control-tree associated with the application by dragging and dropping controls within the control-tree.

In yet a further feature of the content management system, the at least one computer server is further configured to allow the first user to determine a set of controls exposed to the second user via the page editor as the control.

In a feature of the content management system, loading the application in the GUI further includes instantiating a designer associated with a control in the control-tree associated with the application. Preferably, loading the application in the GUI further includes replacing the control with the designer in the control-tree associated with the application.

In an illustrative embodiment the systems and methods disclosed herein encompass computer-readable medium having computer-executable instructions for performing methods or processes of the disclosure, and computer networks and other systems and components that implement the methods or processes of the disclosure.

The above features as well as additional features and aspects of the systems and methods disclosed herein will become apparent from the following detailed description of illustrative embodiments of the systems and methods. In addition, other systems, methods, features and advantages will be or become apparent to one skilled in the art upon examination of the following drawings and detailed description. It is intended that all such additional systems, methods, features and advantages be included within this description and be within the scope of the present disclosure.

BRIEF DESCRIPTION OF THE DRAWINGS

The systems and methods disclosed herein are illustrated in the figures of the accompanying drawings which are meant to be exemplary and not limiting, in which like references and reference numerals are intended to refer to like or corresponding parts, and in which.

DETAILED DESCRIPTION OF PREFERRED EMBODIMENTS

Detailed embodiments of the systems and methods are disclosed hereinafter; however, it is to be understood that the disclosed embodiments are merely exemplary of the systems and methods, which may be embodied in various forms. Therefore, specific functional details disclosed herein are not to be interpreted as limiting, but merely as a basis for the claims and as a representative basis for teaching one skilled in the art to variously employ the systems and methods disclosed herein.

Generally, the systems and methods disclosed herein include and are implemented within a computer system having one or more databases and other storage apparatuses, servers, and additional components, such as processors, terminals and displays, computer-readable media, algorithms, modules, and other computer-related components. The computer systems are especially configured and adapted to perform the functions and processes of the systems as disclosed herein.

As disclosed herein, the systems are illustrated in an exemplary environment in which the systems interact with one or more users directly, indirectly, or through a third party intermediary. A user includes, for example, an end user, an intermediary user, an internet user, an authorized user, etc. An authorized user is typically associated with a corporate entity or company, an advertising agency, an Internet web service content provider, or other similar entity, who has permission to access a specific page's or root control's control-tree, and content, and permission to create or edit content associated with the specific page's or root control's control-tree.

Figure 1:
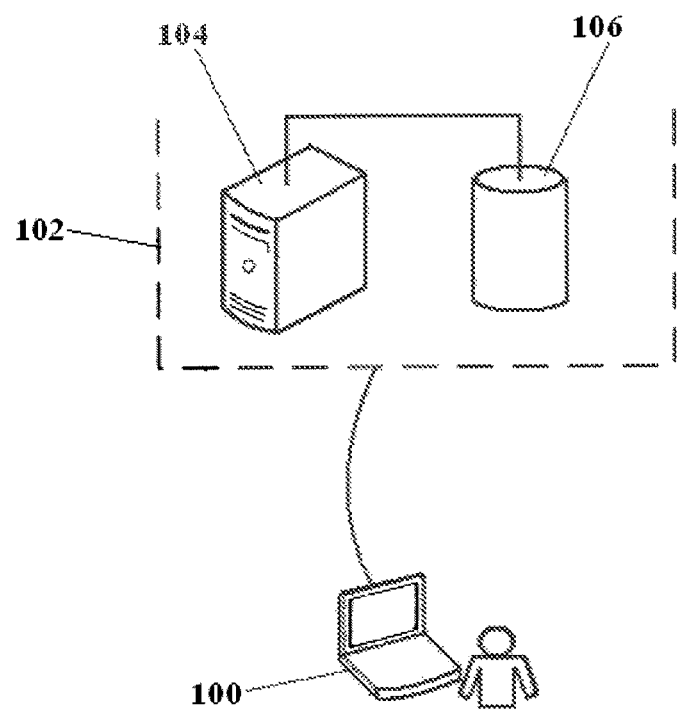
FIG. 1 illustrates an embodiment of system architecture for implementing systems and methods for polymorphic or dynamic content generation.

A preferred system architecture for implementing the systems and methods for polymorphic or dynamic content generation according to an illustrative embodiment is described with reference to FIG. 1. As illustrated, the system architecture includes at least one client device 100 in electronic or data communication with a computer system 102. The computer system 102 includes, for example, at least one computer server 104, in communication with the client device 100, and at least one database 106 in communication with and accessible by the at least one computer server 104, in conventional manner.

The client device(s) 100 will typically be an electronic communication device, such as a laptop or desktop computer, a computer terminal, a handheld/mobile computing device or tablet, including smart-phones, mobile phones, and/or PDAs, and the like, as now exist or as developed hereinafter. The client device 100 will typically be in electronic, bi-directional communication with the computer system 102 via a wired or wireless network. For example, the client device 100 may be networked directly, indirectly, through a third party intermediary, wirelessly, over the Internet, or otherwise with the computer system 102—in conventional manner.

The computer server(s) 104 preferably include conventional processors, memory, I/O capabilities and components, and programming modules and/or computer readable media that enable performance of the functions and operation of the system as described herein. The computer server(s) 104 are typically in electronic, bi-directional communication with the client device 100 via a wired or wireless network, for example, the computer server(s) 104 may be networked directly, indirectly, through a third party intermediary, wirelessly, over the Internet, or otherwise with the client device 100—in conventional manner.

Similarly, the database(s) 106 will typically be in electronic, bi-directional communication with the computer server(s) 104 via a wired or wireless network. For example, the database(s) 106 may be networked directly, indirectly, wirelessly, over the Internet, or otherwise with the computer server(s) 104. The database(s) 106 may be implemented in one or more hardware components and may be located locally or remotely from the computer server(s) 104—all in conventional manner.

In this illustrative embodiment, the systems and methods disclosed herein preferably are provided to the client device(s) 100 or user(s) of the client device(s) 100 via the Internet in a conventional "software as a service" (SaaS) construction. SaaS, sometimes also referred to as "software on demand," is software and/or one or more computer applications or modules that are deployed and accessible to end users (typically having a UserID and password) over the Internet and/or is deployed to run behind a firewall on a local area network or personal computer or server.

In an illustrative embodiment, the systems and methods disclosed herein may be embodied on computer readable media. The computer readable media may be installed directly on the client device(s) 100 or accessed remotely by the client device(s) 100, thus, possibly rendering communication with the computer system 102 unnecessary.

In an illustrative embodiment, the computer system 102 provides a content management system including a page editor. In this illustrative embodiment, the page editor provides development tools designed to allow users to design, create, edit, store, organize and/or publish content. Preferably, an application developer initially provides the user(s) with one or more application or page templates. For example, the application developer may provide the user(s) with several layouts that may be used as templates by the user(s) to easily design, create, edit, store, organize and/or publish one or more customized pages having content, such as web pages. Typically, each layout is unique and the user(s) can quickly add text, video controls, images, featured content and more to new or existing pages or applications.

Some illustrative examples of templates include, but are certainly not limited to, the following types of layouts (although the range of possible templates are unlimited): a layout containing two images, one on the left and one on the right, and text; a layout containing one image on the left and text; a layout containing one image on the right and text; a layout containing a header, a footer, and a single panel or container for inserting content; a layout containing a header, a footer, and more than one panel or container, for example one on the right and one on the left for inserting content; a layout containing a video, an image, and text; and other templates of similar type and arrangement and ability to display a full range of content. Although the user(s) have been described as starting with a template provided by the application developer, it should be appreciated by one skilled in the art that the user(s) may also create customized pages or applications from scratch without utilizing a pre-defined or pre-existing template.

In an illustrative embodiment, the page editor includes a graphical user interface (GUI). Preferably, the GUI is presented by the computer system 102 to the user(s) via the client device(s) 100. The GUI presents development tools to the user(s) to allow the user(s) to design, create, edit, store, organize, and/or publish, dynamically generated content that is presented and capable of being included as part of an existing software application or web site without requiring the user to have prior, significant training or programming expertise. Further, the page editor allows the user(s) to expose instances of the page editor, including the GUI and development tools, as part of the user(s) content and to adjust the content-generation experience presented to consumers of the user's content. This allows software application content generation to take on many different experiences and to be exposed to many different types of application users without the need to create additional content generation tools. For example, instead of simply building a page editor for an application or an isolated development environment, the development tools are built as a reusable control that allows applications or pages (i.e. presentations) to expose such development or design tools to the user(s) that allow minimally trained and/or technically inexperienced user(s) easily to create application assets, to arrange them in a desired physical layout or format, and optionally to expose the tools to even more users. Thus, applications can be created and edited collaboratively by different users at different levels.

In an illustrative embodiment, content is generated using a control-tree model. In the control-tree model, the user(s) begins with a root control or page and creates application content by creating a tree structure by nesting controls. Preferably, a page is a logical grouping of controls. This logical grouping of controls in a page is sometimes called the page's control-tree. Controls can be added to a page, moved to a different position within the page, or deleted from a page.

Preferably, a control constitutes a fundamental unit of content within an application or page, which represents a dedicated space or location and content type on a page being edited. For example, a control is an instance of a defined control class (i.e. a "control-type"). The control is responsible for presenting the "run-time" experience for its associated content to the user. Some controls can serve as containers for other controls, for example, in a parent-child relationship. A control class can be associated with a designer class. A control may be any type of control such as but not limited to one or more of the following examples of control types: Accordian View, Acknowledgement, Announcement, Button, Calendar, Check Box, Compare Validator, Confirmation, Content, Content Editor, Content Viewer, Drop-Down List, Event Viewer, External Hyperlink, Featured Content, File Explorer, File Upload, Flash Player, Generic HTML Widget, Generic Repeater, RSS Widget, Generic Text Widget, Grid, Hierarchical Data Viewer, Host Control, Hover Pop-up, Hyperlink, IFrame, Image, Image Button, Internal Hyperlink, Label, Library Image, Library Link Viewer, Library Video, Library Viewer, List, Literal, Logon, Logout, Menu, Modal Pop-up, Multi-Upload, News RSS Widget, Panel, Pop-Out Video Player, Questionnaire, Radio Button, Radio Button List, Range Validator, Regular Expression Validator, Required Field Validator, Search Box, Styled Button, Styled Menu, Style Sheet, Synopsis, Tab Panel, Tab View, Tag Viewer, Template Repeater, Text Area, Text Box, Text Editor, To Do List, Tooltip, Training, Tree View, Page Editor, and Video.

Preferably, a designer is an instance of a designer class and is associated with a control. Typically, the designer is responsible for presenting the "design-time" experience for the content associated with its control and allows the user(s) easily to make changes (e.g., additions, edits, deletions) to the content.

In an illustrative embodiment, the database 106 stores content, metadata, and/or other information associated with the controls and designers that may be needed by the content managmement system when rendering the application's or page's control-tree.

Figure 2:
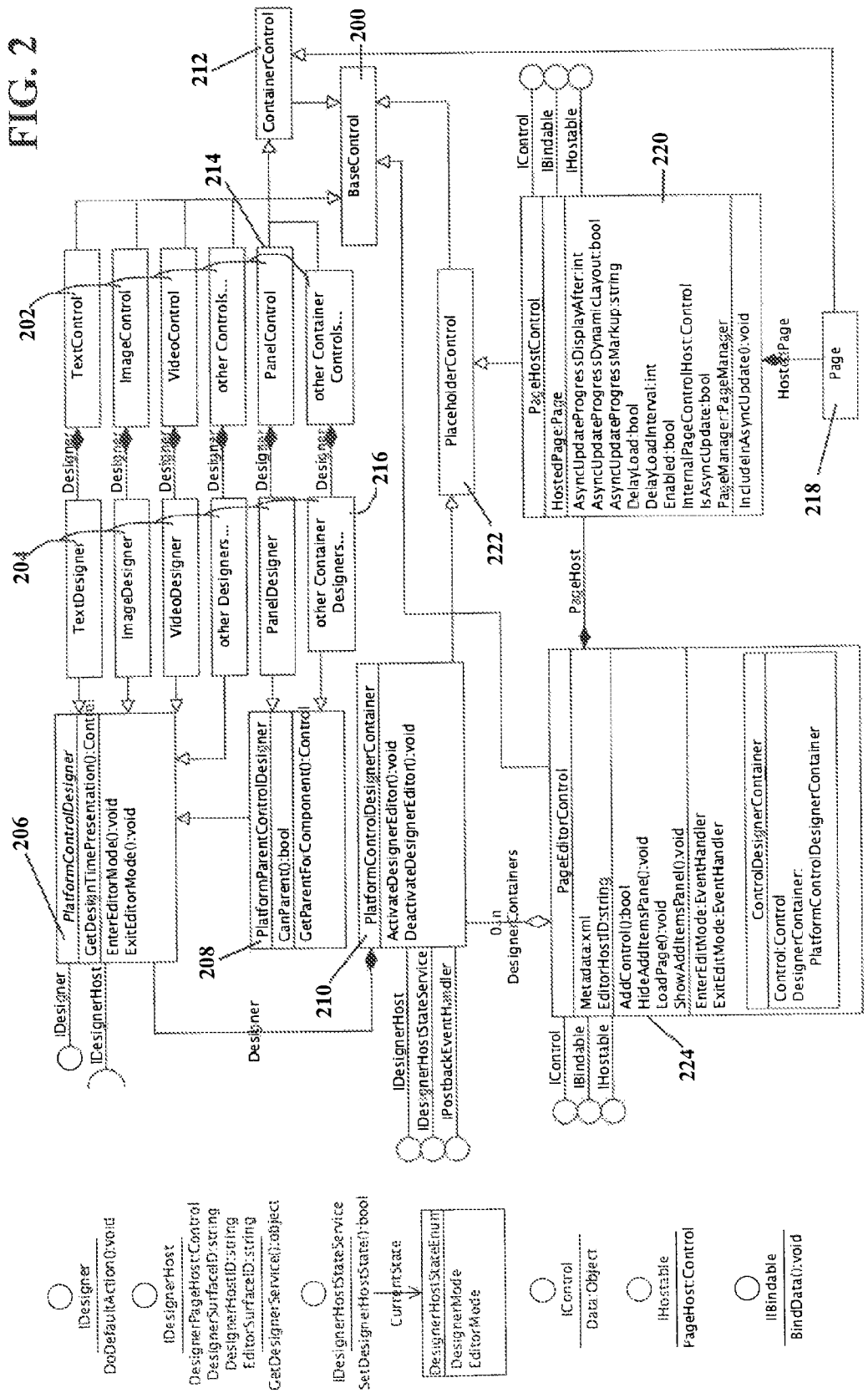
FIG. 2 illustrates an embodiment of a class diagram.

An embodiment of an exemplary class diagram according to an illustrative embodiment is described with reference to FIG. 2. As illustrated in FIG. 2, there is a base control class 200, from which each of the controls-types 202 preferably inherits its basic or common traits or attributes. For example, in polymorphism, each control-type 202 inherits its basic or common traits or attributes from the base control class 200. The control-type 202 typically is associated with a designer class, such as designer classes 204. It should be appreciated by one skilled in the art that the methodology of how each control-type 202 is associated with the designer class 204 is dependent upon the programming language in which the control-types are implemented. For example, in the C# language, an "attribute" is utilized. Preferably, the designer classes 204 inherit from a platform control designer 206 or a platform parent control designer 208. The platform control designer 206 includes a reference to the platform control designer container 210, in which it is instantiated by the page editor control 224.

As illustrated, a container control 212 inherits from the base control class 200. In an illustrative embodiment the container control 212 represents a control-type that is capable of containing other control-types, such as a panel control 214. Typically, container controls 212 and 214 are associated with a container designer 216, which in turn inherits from the platform parent control designer 208. In an illustrative embodiment, a page 218 inherits from the container control 212. The page 218 typically has a collection of controls within the page 218. Further, the page host control 220 may inherit from a place holder control 222, which in turn inherits from the platform control designer container 210.

Further, as illustrated in FIG. 2, a page editor control 224 is included. Preferably, the page editor control 224 inherits from the base control 200. Typically, the page editor control 224 accepts a page ID, such as, for example, via the data object from an IControl interface. Further, the page editor control 224 contains a collection of platform control designer containers 210, one platform control designer container 210 for each control in the control-tree of the page 218 associated with the page editor control 224. Preferably, the page editor control 224 allows users to add controls to a page, move controls on a page, and delete controls from a page. The page editor control 224 instantiates the designers for the controls on the page and replaces the controls with their designers hosted in platform control designer containers 210 within the control-tree. Importantly, the page editor 224 is itself a control. This means that the page editor control 224 can be placed on a page and presented to other users. For example, the "run-time" experience of the page editor control 224 is to present the "design-time" experience for a page with which is has been associated.

In an illustrative embodiment, the computer system 102 and page editor allow the user(s) to access the GUI and create control-trees, add controls to control-trees, re-order the controls within a control-tree, remove controls from control-trees, edit the properties defined by controls, and delete control-trees. Further, the page editor is itself a control (i.e. a page or application editor control). For example, instances of the page editor control can be added as a child control of the page or application or even as a child control of another control within the page or application. Thus, instances of the page editor, including the GUI and development tools, may be added to more than one control-tree and exposed as part of the user(s) content. Further, each of the page editor instances' behavior can be calibrated by the user(s) by defining the properties of each of the instances.

To design, create, edit, store, organize and/or publish content, the user(s) opens or accesses the content management system in page editor mode. Preferably, the content management system is accessed in page editor mode by the user(s) via clicking on an edit button or link within the application or page the user wishes to edit. In an illustrative embodiment, access to the page editor is restricted to authorized users. For example, prior to allowing the user(s) access to the page editor, the user(s) may have to log into the page editor using a user name (e.g. userID) and password. The user(s) name and password authenticate the user(s) identity and/or role, such as an administrator, to determine whether the user(s) are authorized to design, create, edit, store, organize and/or publish dynamically generated content that is associated with the page or application. The page editor may include various levels of access associated with various roles. For example an administrator may be authorized to access and design, create, edit, store, organize and/or publish dynamically generated content, while a subordinate employee may only be authorized to edit the existing dynamically generated content.

Figure 3:
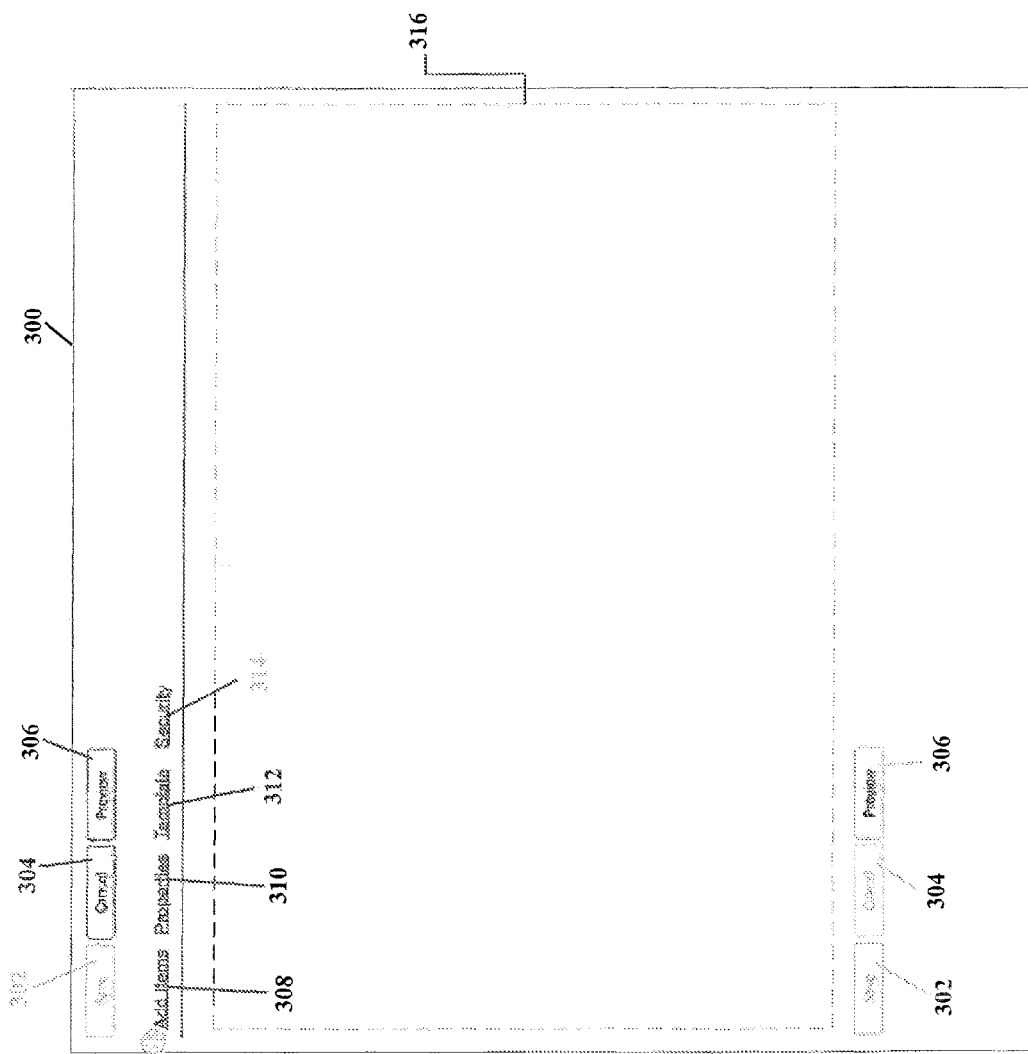
FIG. 3 illustrates an embodiment of a graphical user interface (GUI) of a page editor when editing a page displayed to a user via a client device.

Preferably, a GUI 300 of the page editor is displayed to the user(s), via the client device(s), when a page is loaded into the page editor for editing according to an illustrative embodiment, as shown in FIG. 3. As illustrated, the blank page or application initially has a empty control-tree, meaning there are no controls contained in the page or application. In edit mode, the GUI 300 provides the user(s) with a save button 302, a cancel button 304, and a preview button 306. The GUI 300 also includes an add items link 308, a properties link 310, a template link 312, and a security link 314. The save button 302 allows the user(s) to save any changes or modifications the user(s) has made to the page or application. The cancel button 304 allows the user(s) to cancel any changes or modifications the user(s) has made to the page or application. The preview button 306 allows the user(s) to preview the content of the page or application as it would be displayed to or viewed by others (i.e., not how the page appears in the current edit mode). The add items link 308 allows the user(s) to add controls to the page or application's control-tree. The properties link 310 allows the user(s) to view and/or modify the properties of the page or application, such as but not limited to the status of the page or application (i.e. enabled or disabled), the start date of the page or application, the end date of the page or application, the location of the page or application, the title of the page or application, the description of the page or application, any filters and/or tags associated with the page or application, and when the page or application was last updated. The template link 312 allows the user(s) to select a pre-prepared page or application template to begin with—if the user(s) does not want to work from an initially blank page. The security link 314 allows the user(s) to set the security levels, such as who can access, design, create, edit, store, organize and/or publish content associated with the page or application.

As illustrated in FIG. 3, the GUI 300 displays a panel or container 316 associated with the page or application into which the user(s) may add controls. In this embodiment the page or application has a single panel or container 316. However, it should be appreciated by one skilled in the art that any number of panels or containers 316 may be added to or included in the page or application.

In an illustrative embodiment, to add a control to the page or application, the user(s) selects the add items link 308. Upon selecting the add items link 308 an add items box 400 opens or expands and is displayed via the GUI to the user(s), as shown in greater detail in FIG. 4. Preferably, the GUI displays the add items box 400 to the user(s), via the client device(s), when editing a web page according to an illustrative embodiment and is described with reference to FIG. 4. Upon selecting the add items link 308 the add items link 308 is replaced with a close link 402, which allows the user(s) to close the add items box 400 if desired. The add items box 400 includes a list of controls 404 that may be added to the control-tree associated with the page or application. Preferably, the list of controls 404 includes a plurality of controls, such as any number of the controls listed and described in greater detail above. The controls may be added to the control-tree associated with the page or application to enable the user(s) to add content to the page or application, such as for example text, images, videos, documents, links, additional pages or applications, headers, footers, and panels.

Figure 5:
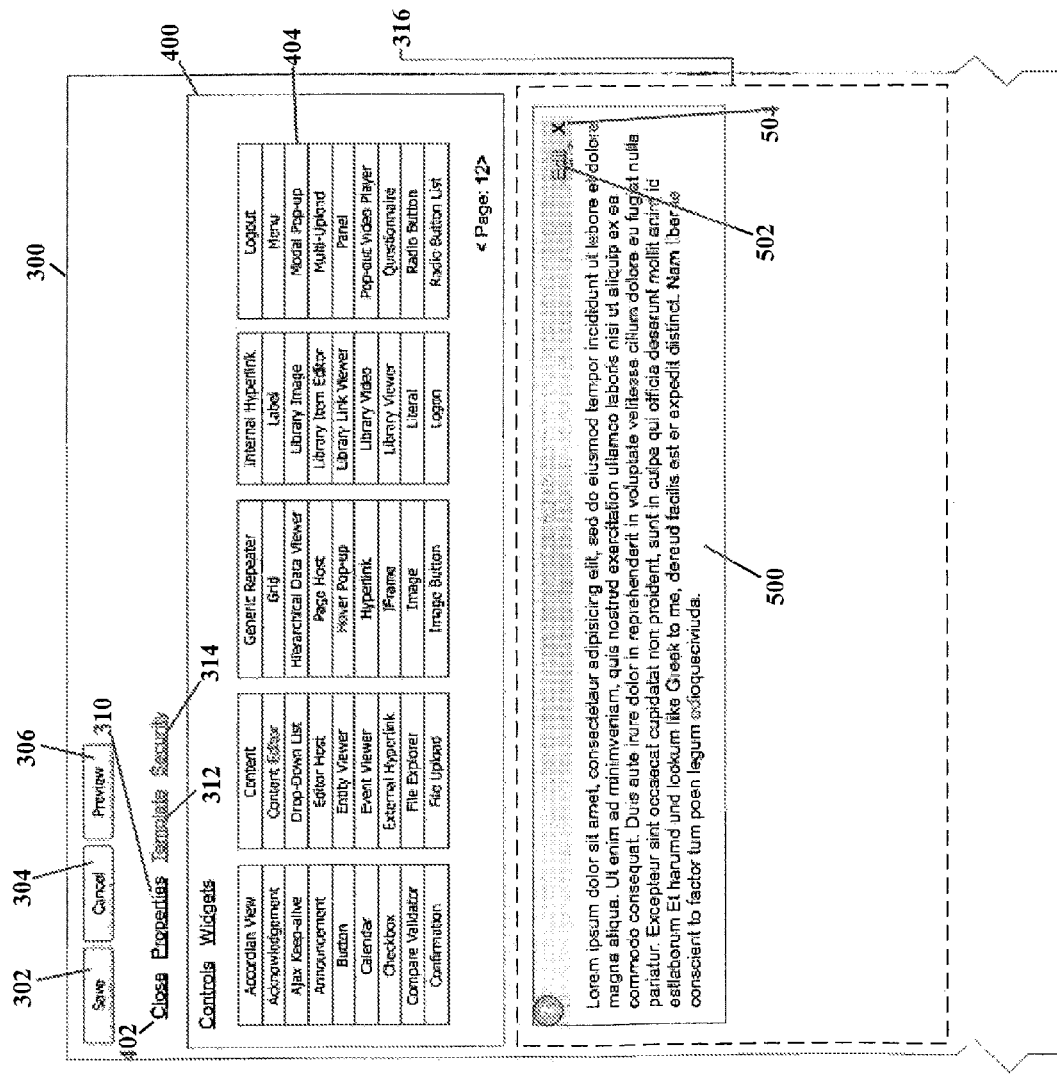
FIG. 5 illustrates an embodiment of the GUI displaying a control added to a control-tree associated with a page.

Typically, the user(s) selects one or more controls from the list of controls 404 that the user(s) desires to add to the page or application's control-tree. Upon selecting a control the control is added to the panel 316 associated with the page or application, as illustrated in FIG. 5. As illustrated in FIG. 5, the user(s) has selected a control 500 to be added to the control-tree associated with the page or application, and the control 500 is displayed in panel 316. The selected control 500 includes an edit button 502 and a delete button 504. The edit button 502 can be selected by the user(s) to edit the properties of the control 500, and the delete button 504 can be selected by the user(s) to delete the control 500 from the control-tree associated with the page or application.

When the user(s) is finished adding controls to the page or application, the user(s) may save the modifications the user(s) has made to the page or application by selecting the save button 302. The user(s) may cancel the modifications the user(s) has made to the page or application by selecting the cancel button 304. The user(s) may preview the modifications the user(s) has made to the page or application by selecting the preview button 306. Upon selecting the preview button, the user(s) is presented with a GUI displaying the content of the modified page or application as it would be viewed by others, such as a customer of the user(s).

Figure 6:
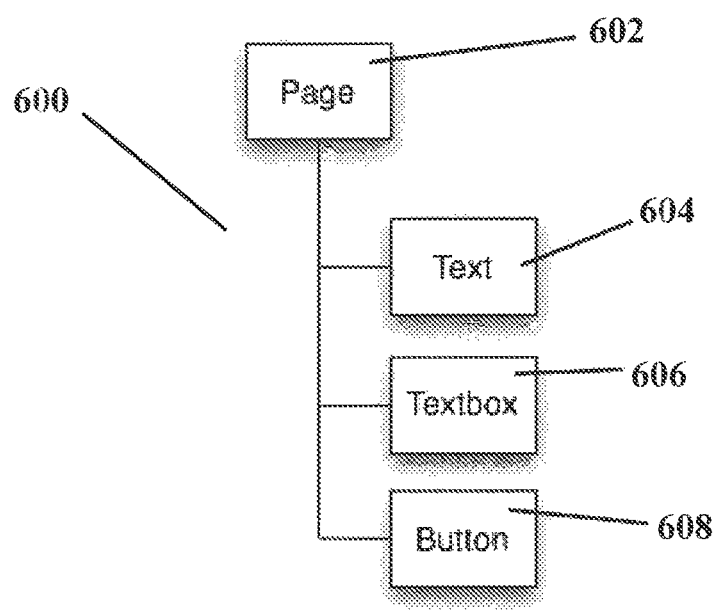
FIGS. 6-9 illustrate embodiments of control-trees associated with a page or application.

Control-trees associated with a page or application according to an illustrative embodiment are described with reference to FIGS. 6-9. As illustrated in FIG. 6, a control-tree 600 has a page root control 602, onto which three controls have been added. The three controls include a text control 604, a textbox control 606, and a button control 608. The text control 604, textbox control 606, and button control 608 are controls located within the root page control 602. For example, the text control 604, textbox control 606, and button control 608 are child controls of the root page control 602 or parent control, and inherit the core properties and attributes of the root page control 602.

Figure 7:
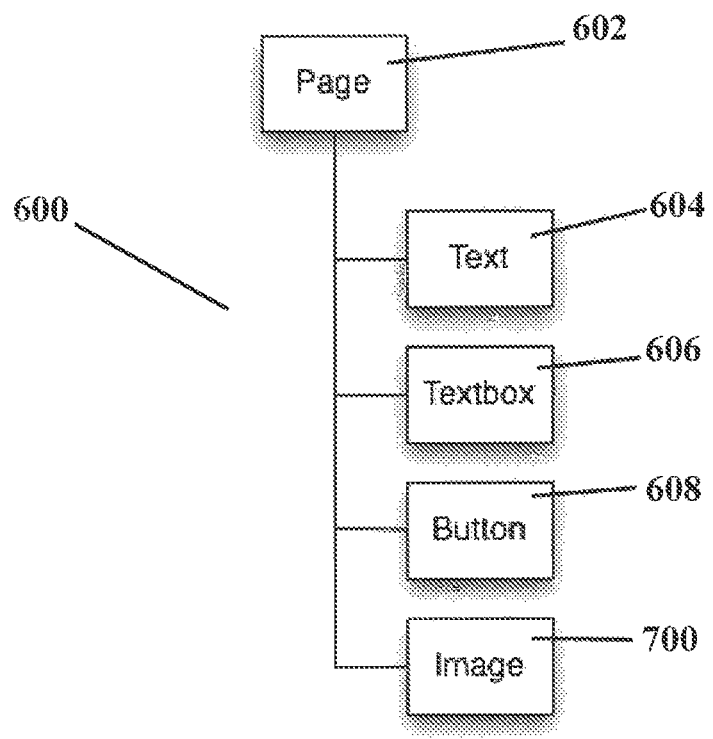
Figure 8:
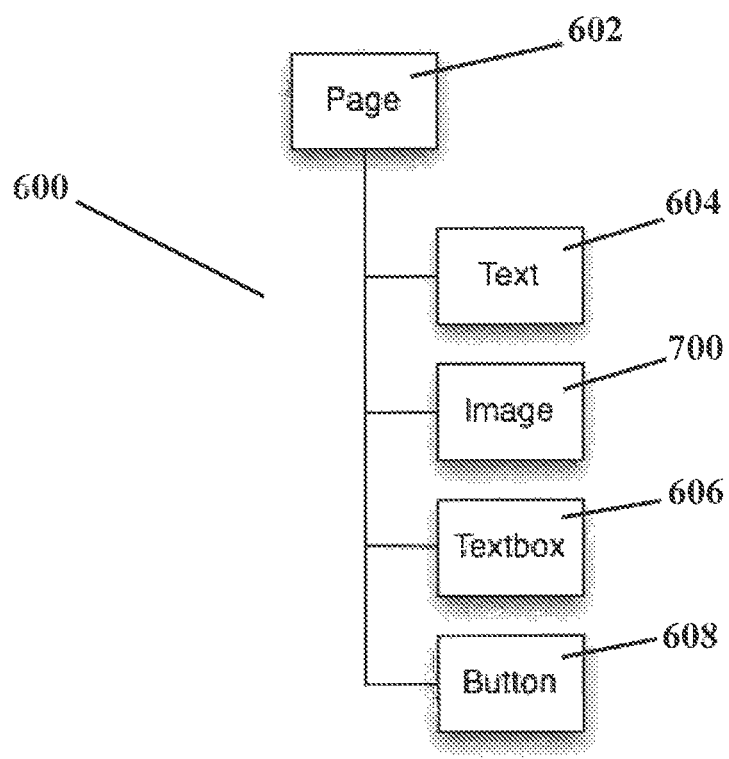

When the user(s) adds a control to the control-tree 600 associated with the page or application, as described above with reference to FIGS. 3-5, the control is added to the control-tree 600 as a child control of the root page control 602. As illustrated in FIG. 7, an image control 700 is added to the control-tree 600 in accordance with the procedures described above with reference to FIGS. 3-5. The image control 700 was added as a child control of the root page control 602. Further, the page editor allows the user(s) to change the position of controls within the control-tree 600. As illustrated in FIG. 8, the image control 700, which is at the bottom of the control-tree 600 in FIG. 7, may be moved to a different position within the control-tree 600. In an illustrative embodiment, the controls may be moved by the user(s) of the page editor using a conventional drag and drop methodology.

Figure 9:
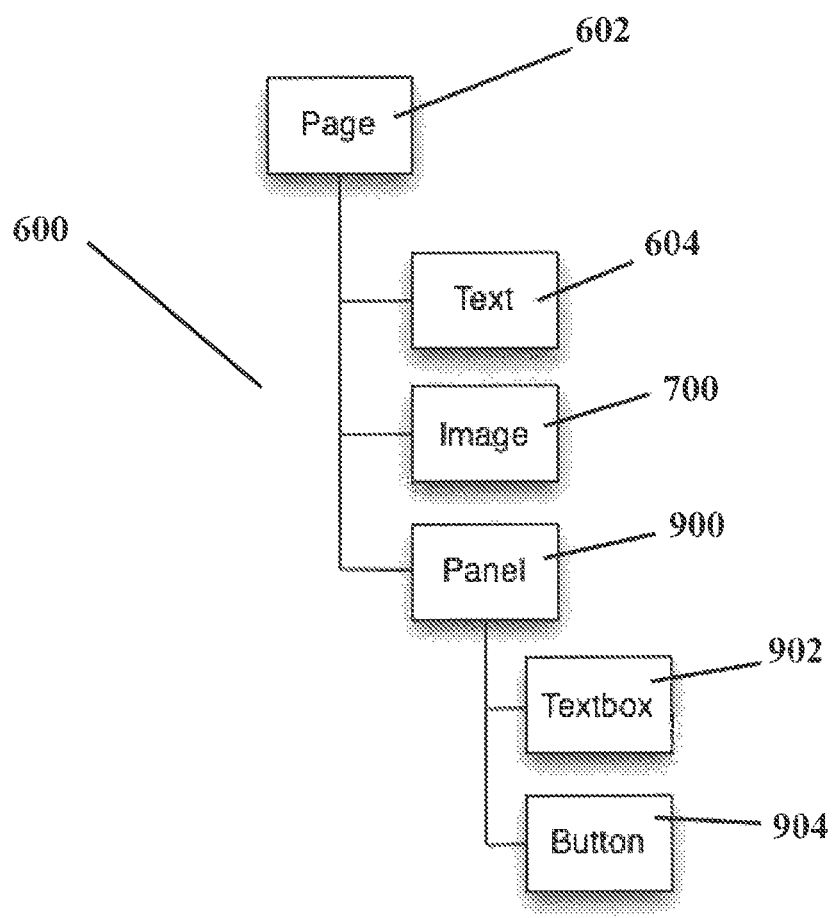

As illustrated in FIG. 9, another control is added to the control-tree 600, in accordance with the procedures described above with reference to FIGS. 3-5. A panel or container control 900 is added to the control-tree 600 as a child control of the root page control 602. According to FIG. 9, the textbox control 606 and the button control 608 (shown in FIG. 6) may be moved to become child controls of the panel control 900, resulting in a textbox control 902 and a button control 904. As mentioned above, the controls may be moved by the user(s) of the page editor by a drag and drop methodology. Thus, the page editor allow the user(s) to easily create and/or edit a page or application by altering, modifying, and/or restructuring the control-tree associated with the page or application.

Figure 10:
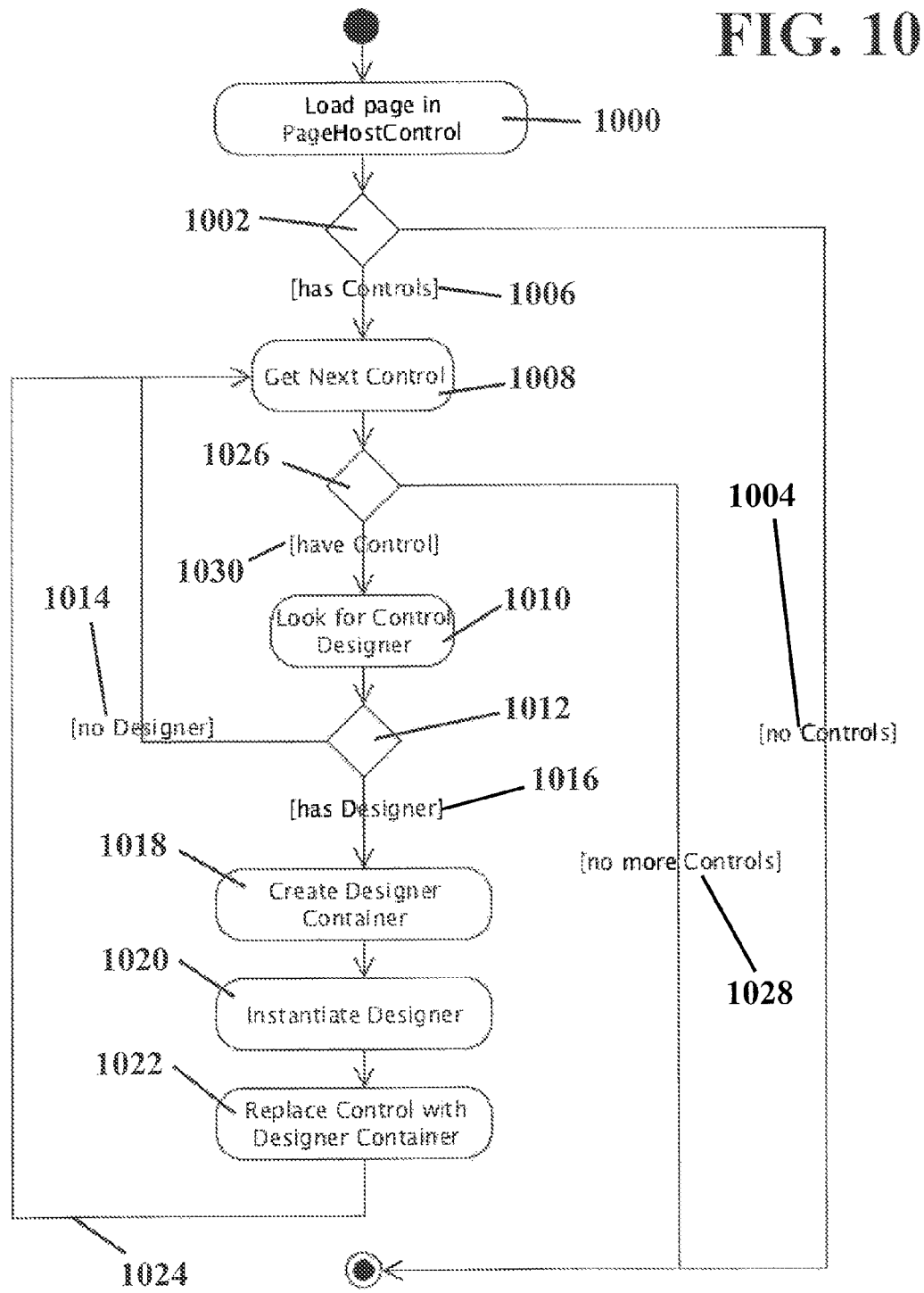
FIG. 10 illustrates an embodiment of a flow diagram of a method of loading a page or application into the page editor for editing.

A flow diagram of a method of loading a page or application into the page editor for editing according to an illustrative embodiment is described with reference to FIG. 10. When the user(s) selects a page or application to edit or requests to edit a page or application, the page or application is loaded into the page editor. Initially, the page editor receives a load page command 1000. As the page or application is loaded, the page editor determines whether the page or application contains controls, step 1002. If the page or application does not have any controls the page editor loads the blank page in the page editor, step 1004. If the page or application has controls, step 1006, in the page's or application's control-tree, the page editor iterates over the controls in the page's or application's control-tree. More specifically, the page editor gets the next control in the page's or application's control-tree, step 1008, and, if there is a control, as determined at step 1030, then looks for the control designer, step 1010.

To look for the control designer, the page editor determines whether the control has a control designer, step 1012. If the control does not have a designer, step 1014, the page editor returns to step 1008 to get the next control in the page's or application's control-tree. If the control does have a designer, step 1016, the page editor creates a designer container, step 1018. The page editor then instantiates the designer, step 1020, and replaces the control with a designer container, step 1022. The page editor then returns, step 1024, to step 1008 and determines whether the page or application contains additional controls in the page's or application's control-tree, step 1026. If the page or application does not have any more controls then the page editor proceeds to load the page or application, step 1028. If the page or application does have more controls, step 1030, the page editor reiterates steps 1010-1026 until the page or application does not have any more controls. Then the page editor proceeds to load the page or application, step 1028.

Figure 11:
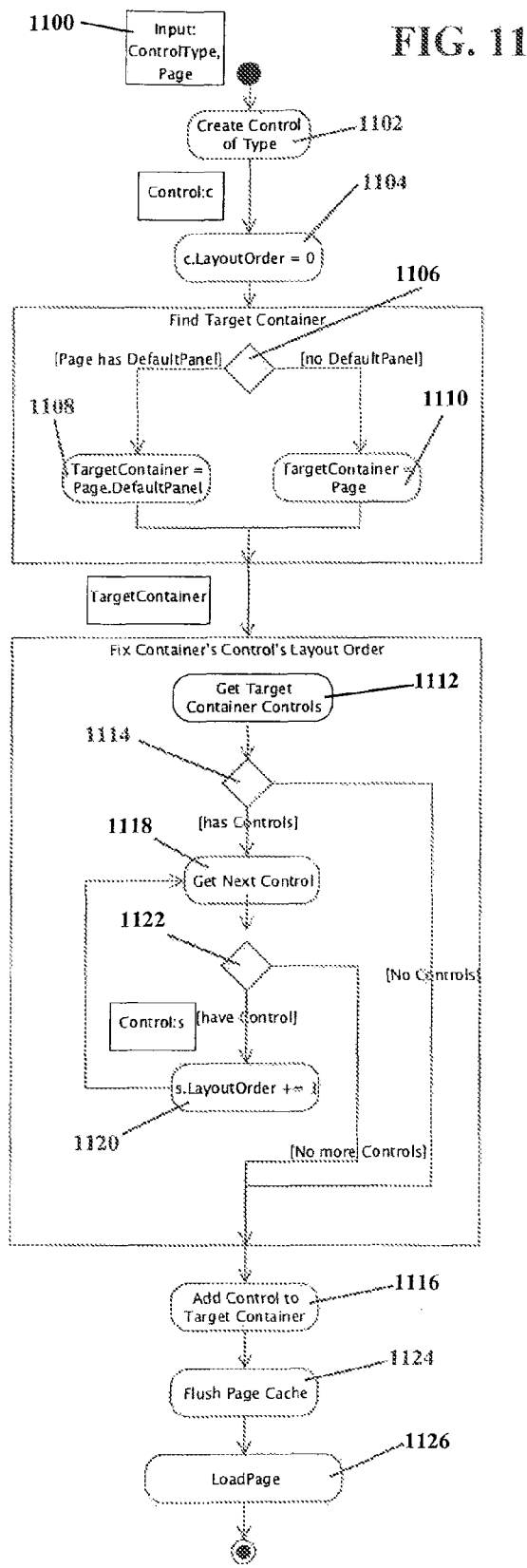
FIG. 11 illustrates an embodiment of a flow diagram of a method of adding a control to a page or application via the page editor.

A flow diagram of a method of adding a control to a page or application via the page editor according to an illustrative embodiment is described with reference to FIG. 11. When the user(s) adds a control to the control-tree associated with the page or application, as described above with reference to FIGS. 3-5, the page editor creates a control of the selected control type and adds the new control to the control-tree associated with the page or application. Preferably, the page editor receives an input control command, step 1100, in response to the user(s) selecting a control to add to the control-tree associated with the page or application. The page editor then creates a new control of the selected control type, step 1102. Typically, the page editor places the new control within the pages' or application's control-tree as the first control found on the page or application. However, the location of the new control in the page's or application's control-tree can be manipulated, as previously described and as described hereinafter.

More specifically, the initial layout order of the new control is set to zero, step 1104. The page editor then determines the target container to place the new control into, step 1106. If the page or application has a default panel or container, the target container is determined to be the default panel or container, step 1108, meaning that the new control will be added as a child control to the default panel or container associated with the page or application. However, if the page or application does not have a default panel or container, the target control is set to the page or application, step 1110, meaning that the new control will be added to the page or application as a child control of the page's or application's root control.

Then, the page editor fixes the layout order of the container where the new control will be added. Preferably, the page editor iterates though the controls contained in the container where the new control is to be added changing the layout order of each control in the container. More specifically, the page editor gets the controls associated with the control-tree of the target container, step 1112. The page editor then determines whether the target container has any controls, step 1114. If the target container does not have any controls the page editor simply adds the new control to the target container as the first control in the target container, step 1116. If the target container has controls the page editor obtains the next control in the target container, step 1118. Then the page editor alters the layout order of the next control, step 1120, preferably increasing it by one to accommodate for the new control being added as the first control within the control-tree. Then the page editor returns to step 1118 to obtain the next control and determines if there are additional controls associated with the target container, step 1122. If there are additional controls associated with the target container, the page editor repeats steps 1118-1120 until the page editor has increased the layout order by one for each control associated with the target container and step 1122 results in no more controls. Then the page editor proceeds to step 1116 to add the new control to the target container as the first control in the target container's control-tree. After adding the new control to the target container, the page editor flushes the page's or application's cache, step 1124. Then the page or application is re-loaded in the page editor, step 1126, such as described with reference to FIG. 10. The re-loading of the page in the page editor typically causes the design-time experience of each of the controls, including the newly added control, to be re-rendered.

In an illustrative embodiment, instances of the page editor, including the GUI and development tools, may be added as a page editor control to one or more control-trees and exposed as part of the user(s) content. The page editor control implements the same GUI described above as a page editor control that itself can be added to control-trees. This allows the page editor to be exposed to the user(s) and allows the user(s) to expose the page editor to other users, and may even allow the other users to expose the page editor to additional users, etc.

Figure 4:
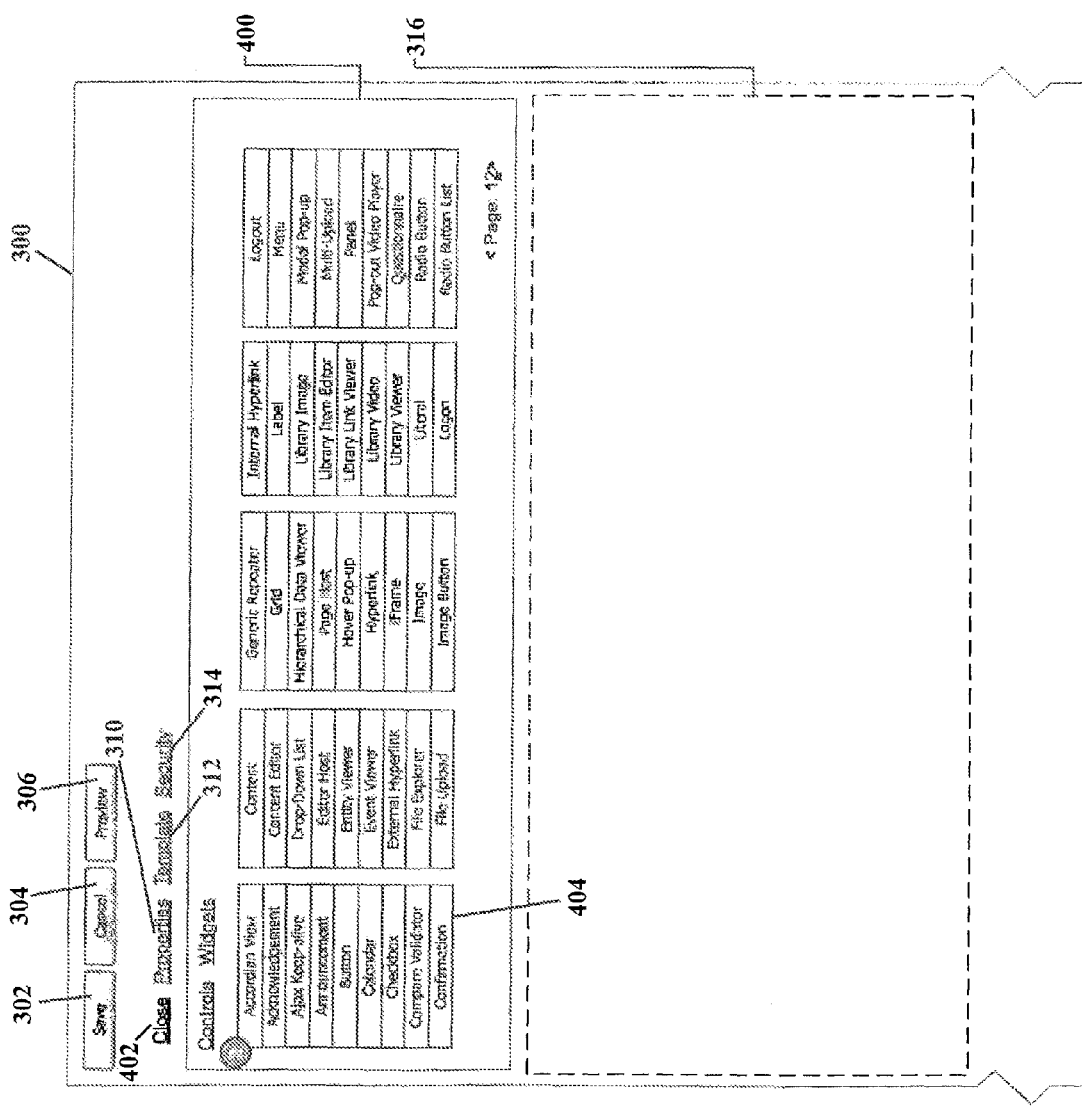
FIG. 4 illustrates an embodiment of the GUI displaying an add items box to the user via the client device.
Figure 12:
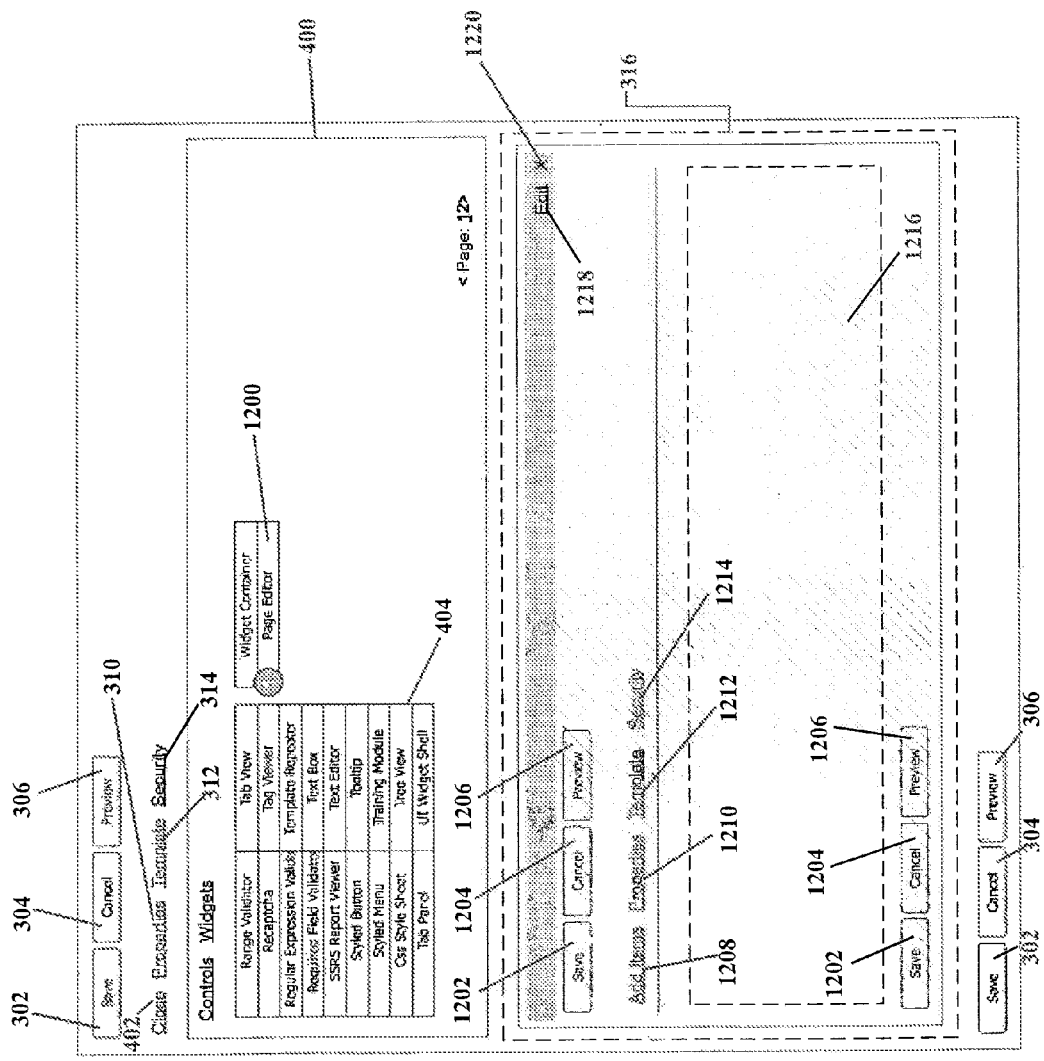
FIG. 12 illustrates an embodiment of a GUI including an instance of the page editor added to a page or application as a control.

An illustrative embodiment of a GUI including an instance of the page editor added to a page or application as a page editor control is described with reference to FIGS. 3, 4, and 12. To add a control to the page or application, the user(s) access the page editor and requests the page editor to edit a desired page or application. The page editor then loads the desired page or application in the page editor. The user(s) then selects the add items link 308. Upon selecting the add items link 308 an add items box 400 opens or expands. The add items box 400 includes a. list of controls 404 that may be added to the control-tree associated with the page or application. One of the controls within the list of controls 404 is a page editor control 1200, The user(s) adds the page editor control 1200 to the page or application by selecting the page editor control 1200. Upon selecting the page editor control 1200, the page editor control 1200 is added to the page's or application's control-tree. As illustrated in FIG. 12, the page editor control is displayed in the panel 316, when the page editor control is added to the page's or application's control-tree.

Figure 13:
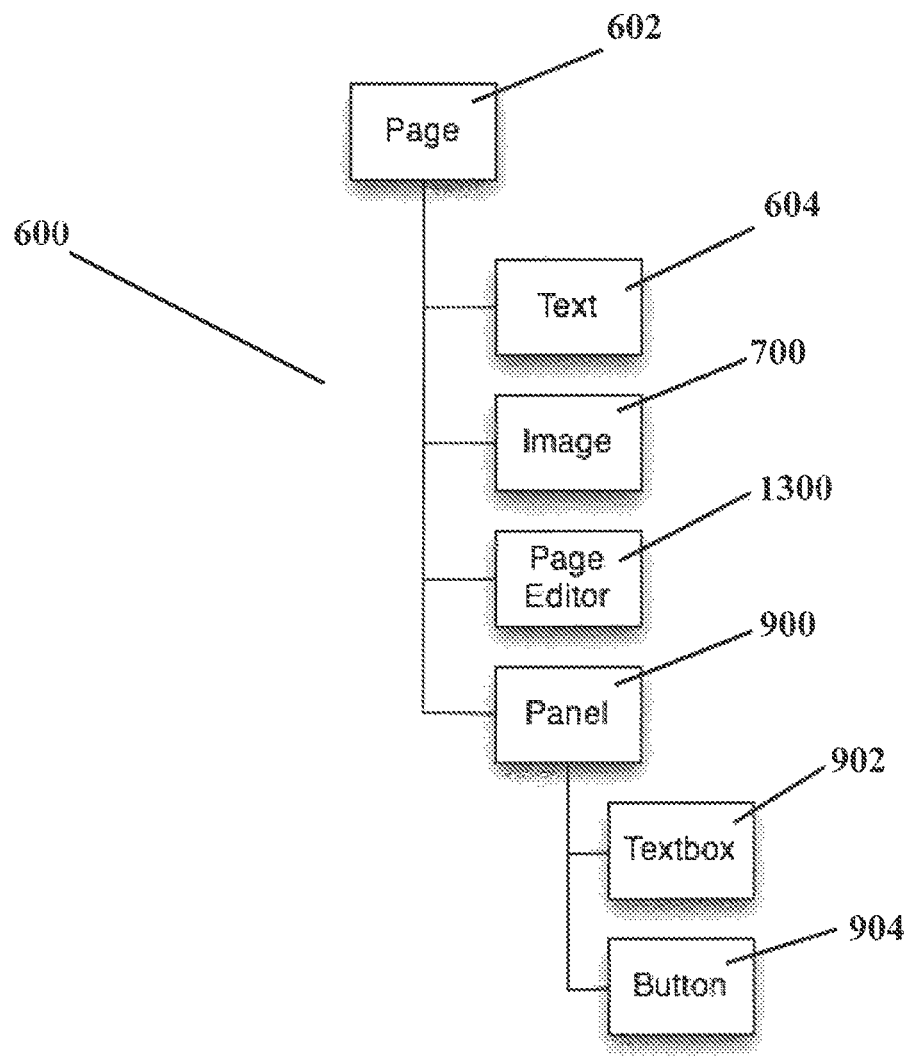
FIG. 13 illustrates an embodiment of a control-tree associated with the page or application including the page editor as a control.

An example control-tree including the page editor control according to an illustrative embodiment is described with reference to FIG. 13. As illustrated in FIG. 13, the page editor control, box 1300, is added to the page's control-tree. Typically, the page editor control 1300 is added to the page's control-tree as a child control of the page root control 602.

As illustrated in FIG. 12, the page editor control 1200 displays an instance of the page editor within the page or application as a control. Preferably, the page editor control 1200 implements the same GUI and development tools described herein. In an illustrative embodiment, the page editor control 1200 provides the user(s) with a save button 1202, a cancel button 1204, a preview button 1206, an add items link 1208, a properties link 1210, a template link 1212, and a security link 1214. The save button 1202 allows the user(s) to save any changes or modifications the user(s) has made to the page or application via the page editor control 1200. The cancel button 1204 allows the user(s) to cancel any changes or modifications the user(s) has made to the page or application via the page editor control 1200. The preview button 1206 allows the user(s) to preview the content of the, page or application added via the page editor control 1200 as it would be viewed by others, i.e. not in edit mode. The add items link 1208 allows the user(s) to add controls to the page or application's control-tree via the page editor control 1200. The properties link 1210 allows the user(s) to view and/or modify the properties of the page or application via the page editor control 1200, such as but not limited to the status of the page or application (i.e. enabled or disabled), the start date of the page or application, the end date of the page or application, the location of the page or application, the title of the page or application, the description of the page or application, any filters and/or tags associated with the page or application, and when the page or application was last updated. The template link 1212 allows the user(s) to select a pre-prepared page or application template to add to the page or application via the page editor control 1200.

The security link 1214 allows the user(s), such as an administrator, to set the security levels, such as who can access, design, create, edit, store, organize and/or publish content associated with the page or application via the page editor control 1200. In an illustrative embodiment, the page editor control 1200 may be added to the page's or application's control-tree by an administrator. The administrator may then allow other users to access the page editor control 1200 to access, design, create, edit, store, organize and/or publish content associated with the page or application via the page editor control 1200. The administrator can restrict access to the page editor control 1200 to authorized users. For example, prior to allowing the user(s) access to the page editor control 1200 the user(s) may have to log into the page editor control 1200 using a user name (or userID) and password. The user(s) name and password typically authenticate the user(s) identity and/or role, such as an employee, to determine whether the user(s) are authorized to design, create, edit, store, organize and/or publish dynamically generated content that is associated with the page or application. The page editor may include various levels of access associated with various roles assigned to each respective user(s). For example, an administrator can set the security settings of the page editor control 1200 to include multiple different user types or roles. For example, the administrator may allow certain users to be authorized to access and design, create, edit, store, organize and/or publish dynamically generated content, while the administrator may only allow other designated users (or class of users) to be authorized to edit the existing dynamically generated content.

In an illustrative embodiment, to add a control to the page or application via the page editor control 1200, the user(s) selects the add items link 1208. Upon selecting the add items link 1208 an add items box opens or expands and is displayed via the GUI to the user(s). The add items box includes a list of controls that may be added to the control-tree associated with the page or application via the page editor control 1200. Preferably, the list of controls includes a plurality of controls, such as any number of the controls listed above. The controls may be added to control-tree associated with the page or application via the page editor control 1200 to enable the user(s) to add content to the page or application, such as for example text, images, videos, documents, links, additional pages or applications, headers, footers, and panels.

Typically, the user(s) selects one or more controls from the list of controls that the user(s) desires to add to the page or application's control-tree via the page editor control 1200. Upon selecting a control the control is added to a panel or container 1216 associated with the page or application.

Since the page editor 1200 is a control, the page editor control 1200 includes an edit button 1218 and a delete button 1220. The edit button 1218 can be selected by the user(s) to edit the properties of the page editor control 1200, and the delete button 1220 can be selected by the user(s) to delete the page editor control 1200 from the control-tree associated with the page or application.

In an illustrative embodiment, the page editor control 1200 allows the user(s), such as an administrator, to set the number and type of controls that the page editor control 1200 displays to other users when the other users select the add items link 1208. For example, the administrator may allow all controls to be listed or a subset of controls to be listed. Thus, an administrator may control what and how another user can modify or edit the page or application via the page editor control 1200. Further, the administrator may control which controls may be modified by the other user. For example, the administrator may only allow certain controls to be edited by the other user, while the remaining controls are locked, or not editable by the other user via the page editor control 1200.

In an illustrative embodiment, one or more additional instances of the page editor control 1200 may be added to the page's or application's control-tree via the page editor control 1200. This allows, for example, an administrator to expose the page editor to other users and further allows the other users to expose the page editor to even further users. Thus, pages or applications can be created collaboratively by different users at different levels of authorization.

Figure 14:
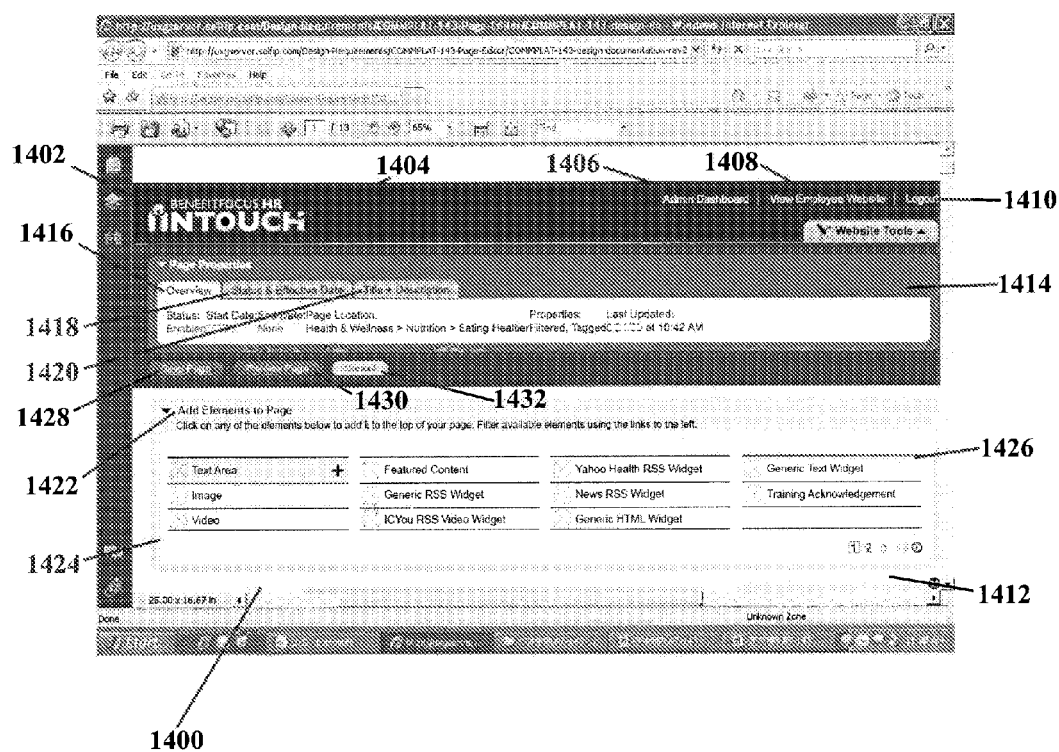
FIG. 14 illustrates an embodiment of a screen shot of a GUI of the page editor.

In an illustrative example, FIGS. 14-18 illustrate screen shots of the page editor being utilized to edit or modify a web page. The content management system allows a user to login and access the page editor to edit or modify a selected root or page control's control-tree. FIG. 14 illustrates a screen shot of a GUI 1400 of the page editor. As illustrated the web page includes a header 1402 containing a title 1404, and Admin dashboard link 1406, a view employee website link 1408, and a logout link 1410. The GUI 1400 visually separates the content 1412 that will be displayed on the web page from the properties 1414 associated with the root or page control's control-tree. As illustrated the properties 1414 are located above the content 1412. The properties panel 1414 includes three tabs, and overview tab 1416, a status and effective date tab 1418, and a title and description tab 1420. The overview tab includes overview information associated with the properties of the root or page control, such as for example, the status of the web page (i.e. enabled or disabled), the start date of the web page, the end date of the web page, the page location, the properties of the web page, and when the web page was last updated or modified.

Figure 15:
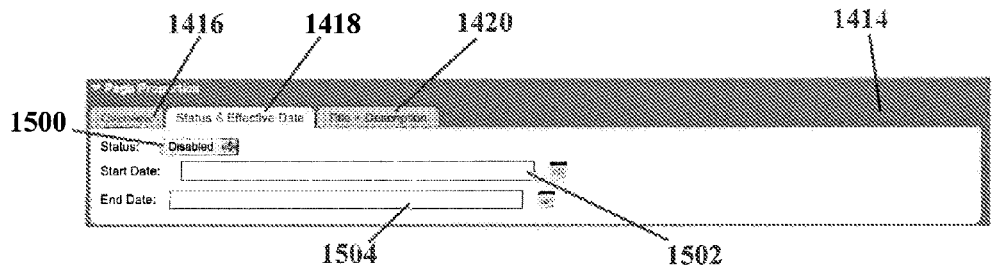
FIG. 15 illustrates an embodiment of a screen shot of properties of a root or page control.

Referring to FIG. 15, the page editor allows the user to edit the properties of the root or page control. As illustrated the user may select the status and effective date tab 1418. Upon selecting the status and effective date tab 1418, the status, start date, and end date associated with the root or page control is displayed to the user. The user may then edit the status by changing the status displayed in drop-down box 1500. Further, the user may edit the start date and end date by entering a start and end date into boxes 1502 and 1504, respectively.

Figure 16:
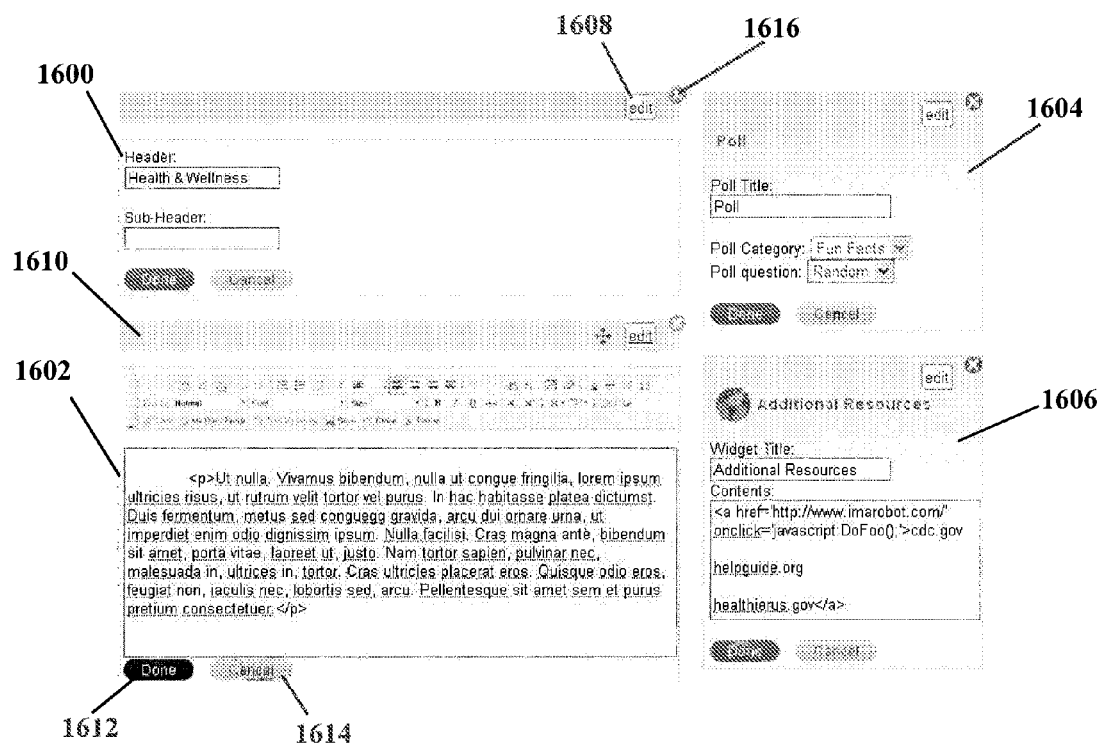
FIG. 16 illustrates an embodiment of a screen shot of controls within the root or page control's control-tree in edit mode.

Referring to FIG. 16, the page editor displays the controls ih the root or page control's control-tree to the user. Upon the user selecting the edit button associated with a control, the control is displayed in edit mode allowing the user to edit the properties associated with the control. As illustrated, four controls are displayed to the user, including a header control 1600, a text control 1602, a poll control 1604, and an additional resources control 1606. Each of the controls 1600-1606 within the root or page control's control-tree has an edit button 1608. Upon the user selecting the edit button 1608 associated with a specific control, the selected control displays an edit properties panel 1610. The edit properties panel 1610 has a Done button 1612 and a Cancel button 1614 associated with the selected control. In the edit propertied panel 1610, the user can edit the properties of the selected control. When the user is finished editing the selected control the user may select the Done button 1612. The Done button 1612 prompts the auto-saving of the modifications the user has made to the selected control. Alternatively, the user may select the Cancel button 1614. The Cancel button 1614 cancels all modifications the user has made to the selected control.

Referring back to FIG. 14, the user may add additional controls to the root or page control's control-tree. To add a control to the root or page control's control-tree, the user selects an add elements to page link 1422. Upon selecting the add elements to page link 1422, an add elements pane 1424 opens and expands displaying a list of available controls 1426. Preferably, the add elements pane 1424 is displayed at the top of the page above the content of the page. The user may then select a control from the list of controls 1426 to add to the root or page control's control-tree.

Figure 17:
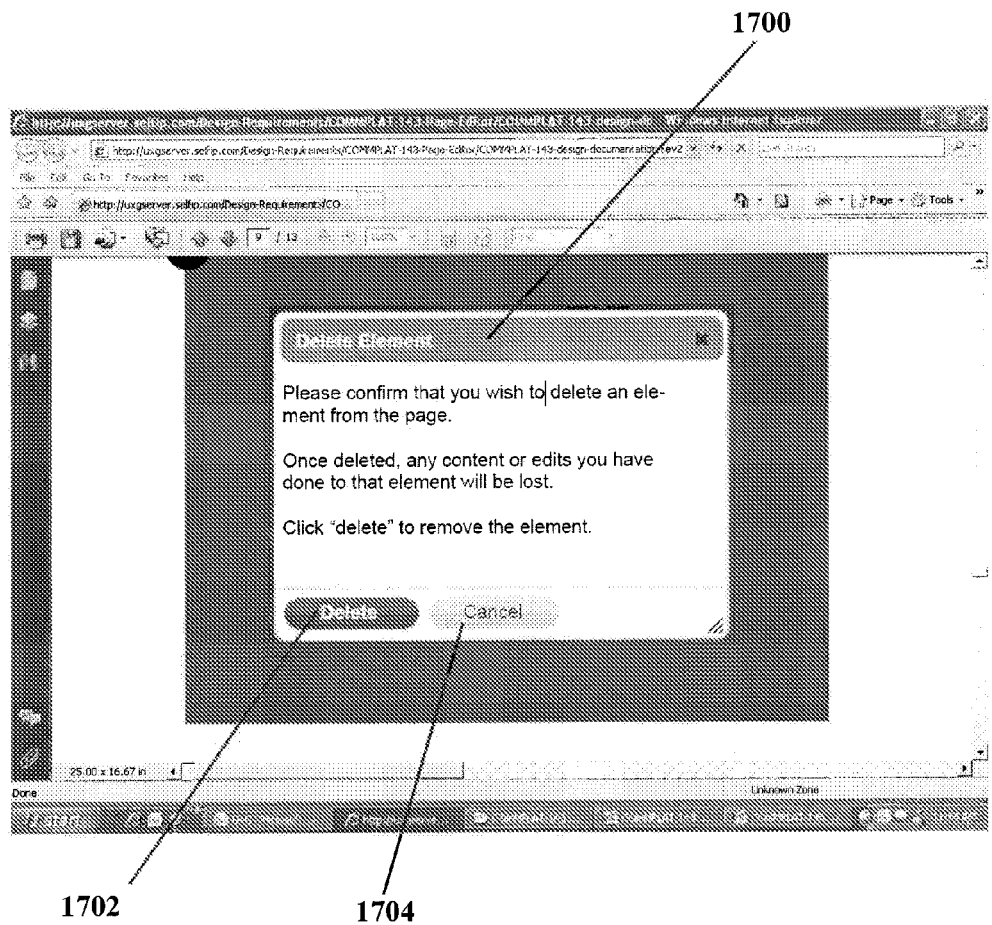
FIG. 17 illustrates an embodiment of a screen shot of removing a control from the root or page control's control-tree.

Referring to FIGS. 16 and 17, the user may remove or delete controls from the root or page control's control-tree. As illustrated in FIG. 16, each of the controls 1600-1606 within the root or page control's control-tree has a delete button 1616. Upon the user selecting the delete button 1616 associated with a specific control, a confirmation message 1700, as illustrated in FIG. 17, is displayed to the user. The confirmation message 1700 preferably prompts the user to confirm that the user wishes to remove the selected control from the root or page control's control-tree. The confirmation message 1700 includes a delete button 1702 and a cancel button 1704. If the user wishes to delete the control from the root or page control's control-tree the user may confirm the delete action by selecting the delete button 1702. If the user, for example, inadvertently selects the delete button 1616, or no longer wishes to remove the control from the root or page control's control-tree, the user may select the cancel button 1704 to cancel the delete or remove action and keep the control in the root or page control's control-tree.

Referring back to FIG. 16, the page editor preferably includes a drag and drop functionality to allow the user to move controls to different locations within the root or page control's control-tree. For example, to move the text control 1602, the user simply drags the text control 1602 to a different location on the page, such as for example to the panel on the right side of the page containing the poll control 1604 and additional resources control 1606. Preferably, the page editor will not allow the user to place one control on top of another control within the page unless the particular control has been defined as a child control of the underlying parent control. In such a case, the child control can be placed within the container defined by the parent control. For example, the user may move the text control 1602 and place it as a child control of the panel control on the right, as mentioned above.

Figure 18:
FIG. 18 illustrates an embodiment of a screen shot of the page editor in a preview mode.

Referring to FIGS. 14 and 18, the page editor includes a save page button 1428, a preview page button 1430, and a cancel button 1432. Selection of the save page button 1428 prompts any modifications made to the root or page control's control-tree to be saved. Alternatively, the cancel button 1432 prompts any modifications made to the root or page control's control-tree to be cancelled or discarded. The preview page button 1430 allows the user to preview or view the edited page as it would be viewed by, for example, a customer or other end user via the Internet. To preview the edited page, the user may select the preview page button 1430. Preferably, upon selection of the preview page button 1430, the preview or the edited page is opened in a separate window or tab 1800, as illustrated in FIG. 18, and shows the user a visual representation of the page without the content management or generation services presented. Typically, the preview window or tab 1800 does not permit the user to interact with or edit anything within the preview mode—it is simply a preview of the look and feel of the final edited page.

As described above, the page editor displays the controls to the user as a pre-determined list of controls and the database 106 stores the content, metadata, and/or other information associated with the controls and designers needed by the content managmement system when rendering the application's or page's control-tree. However, the page editor allows users to add new controls to the control list, such as user customized controls, and/or to modify existing controls to suit the user's desires. For example, a user can add a customized control to draw content from a specific database or library.

As described above, the database 106 stores the content, metadata, and/or other information associated with the controls and designers needed by the content managmement system when rendering the application's or page's control-tree. In an illustrative embodiment the database 106 includes one or more pre-authored content libraries that a user may draw content, such as for example text, documents, videos, images, links, buttons, etc. from via adding controls. However, the content management system and page editor allow users to add and/or delete custom content libraries to the database(s) 106 and upload content, such as for example text, documents, videos, images, links, buttone, etc. into the custom content libraries.

While the systems and methods have been described and illustrated in connection with preferred embodiments, many variations and modifications will be evident to those skilled in the art and may be made without departing from the spirit and scope of the disclosure. For example, while the page editor control has been illustrated and described in the context of web pages, the page editor control may be added or utilized within any application implementing a control-tree methodology.

While various aspects have been described in the context of screen shots, additional aspects, features, and methodologies of the disclosure will be readily discernable therefrom. Many embodiments and adaptations of the disclosure other than those described herein, as well as many variations, modifications, and equivalent arrangements and methodologies, will be apparent from or reasonably suggested by the disclosure, without departing from the substance or scope of the disclosure.

Furthermore, any sequence(s) and/or temporal order of steps of various processes described and claimed herein are those considered to be the best mode contemplated for carrying out the systems and methods disclosed herein. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the disclosure. In addition, some steps may be carried out simultaneously.

Accordingly, while the systems and methods have been described herein in detail in relation to preferred embodiments, it is to be understood that this disclosure is only illustrative and exemplary of the systems and methods and is made merely for purposes of providing a full and enabling disclosure of the invention. The disclosure is thus not to be limited to the precise details of methodology or construction set forth above as such variations and modification are intended to be included within the scope of the disclosure.

What is claimed is:

1. A method for dynamic content generation within an application, comprising:

receiving, by at least one computer, a request from a user to modify a control-tree of a first page associated with the application;

loading, by said at least one computer, said first page of the application into a graphical user interface (GUI) of a second page of the application in response to receiving said request, the GUI including a page editor configured to present a design-time experience for said first page of the application to the user;

providing, by said at least one computer, a list of controls available to said user via said GUI, an instance of the page editor being included as one of the controls in said list of controls available to said user;

allowing, by said at least one computer, said user to select a control from said list of controls available to said user to add to said control-tree of the first page of said application;

adding, by said at least one computer, said instance of the page editor as one of the controls in said control-tree associated with the first page of said application in response to said user selecting said instance of the page editor from said list of controls available to said user; and thereafter, presenting, by said at least one computer, said instance of the page editor as one of the controls on the first page of the application, whereby another user is able to modify the control-tree of a third page of the application by activating said instance of the page editor on the first page of the application, wherein modifying the control-tree of the third page includes adding another instance of the page editor as one of the controls in the control-tree of said third page of the application.

2. The method of claim 1, further comprising displaying to said user via said GUI, by said at least one computer, said instance of the page editor added to said control-tree associated with the first page of said application as said control.

3. The method of claim 1, further comprising determining, by said at least one computer, whether said user is authorized to modify said control-tree associated with the first page of said application.

4. The method of claim 1, further comprising allowing, by said at least one computer, said user to re-order said control-tree associated with the first page of said application by dragging and dropping one or more controls within said control-tree.

5. The method of claim 1, further comprising allowing, by said at least one computer, said another user to modify said control-tree associated with the third page of said application by accessing said instance of the page editor as said control.

6. The method of claim 1, further comprising allowing, by said at least one computer, said user to restrict access to said instance of the page editor as said control.

7. The method of claim 6, further comprising determining, by said at least one computer, whether said another user is authorized to access said instance of the page editor as said control.

8. The method of claim 1, further comprising allowing, by said at least one computer, said user to determine a set of controls presented to said another user via said instance of the page editor as said control.

9. The method of claim 1, wherein said loading said first page of the application in said GUI further includes instantiating, by said at least one computer, a designer associated with one of the controls in said control-tree associated with the first page of said application.

10. The method of claim 9, wherein said loading said first page of the application in said GUI further includes replacing, by said at least one computer, said one of the controls with said designer in said control-tree associated with the first page of said application.

11. A computerized system for enabling users to participate in dynamic content generation associated with one or more pages of an application, comprising: a computer server having at least one processor; a memory storage in electronic communication with the computer server; and a computer readable medium that is usable by the at least one processor and is operatively coupled to the memory storage, the computer readable medium having stored thereon a sequence of instructions that, when executed by the at least one processor, causes the execution of the steps of:

receiving an electronic request from a first user to modify a control-tree of a first page of the application;

in response to receiving the electronic request from the first user, loading the first page of the application into a graphical user interface (GUI) of a second page of the application, wherein the GUI includes a page editor configured to present a design-time experience for the first page of the application to the first user;

displaying, within the GUI, a list of controls available for selection by the first user, wherein an instance of the page editor is included as one of the controls in the list of controls available for selection by the first user;

allowing the first user to select one or more of the controls from the list of controls available to the first user to add to the control-tree of the first page of the application;

in response to selection of the instance of the page editor from the list of controls available for selection by the first user, adding the instance of the page editor as a control to the control-tree of the first page of the application; and thereafter providing the instance of the page editor as one of the controls available to a second user accessing the first page of the application, whereby the second user is able to create a new page of the application by activating the instance of the page editor on the first page of the application and whereby the second user is further able to add another instance of the page editor as one of the controls in the control-tree of the new page of the application.

12. The computerized system of claim 11, further comprising displaying to the first user, within the GUI, the instance of the page editor as the control added to the control-tree associated with the first page of the application.

13. The computerized system of claim 11, further comprising determining whether the first user is authorized to modify the control-tree associated with the first page of the application.

14. The computerized system of claim 11, further comprising allowing the first user to re-order the control-tree associated with the first page of the application by dragging and dropping one or more controls within the control-tree.

15. The computerized system of claim 11, further comprising allowing the second user to modify the control-tree associated with the application by accessing the instance of the page editor.

16. The computerized system of claim 11, further comprising allowing the first user to restrict access to the instance of the page editor.

17. The computerized system of claim 16, further comprising determining whether the second user is authorized to access the instance of the page editor.

18. The computerized system of claim 11, further comprising allowing the first user to determine a set of controls provided to the second user via the instance of the page editor.

19. The computerized system of claim 11, wherein loading the first page of the application into the GUI of the second page of the application includes instantiating a designer associated with the control in the control-tree associated with the first page of the application.

20. The computerized system of claim 19, wherein loading the first page of the application into the GUI of the second page of the application further includes replacing the control with the designer in the control-tree associated with the first page of the application.

* * * * *